United States Patent [19]
Kolbe

[11] 3,879,051
[45] Apr. 22, 1975

[54] VEHICLE BANKING ARM CONSTRUCTION

[76] Inventor: Joachim Kolbe, 5126 Haskell Ave., Encino, Calif. 91316

[22] Filed: Jan. 18, 1973

[21] Appl. No.: 324,754

Related U.S. Application Data

[63] Continuation in part of Ser. No. 185,765, Oct. 1, 1971, Pat. No. 3,726,542, and a continuation in-part of Ser. No. 251,831, May 9, 1972, Pat. No. 3,826,514.

[52] U.S. Cl. ..... 280/96.2 R; 280/112 A; 280/124 B; 267/57
[51] Int. Cl. .......................... B62d 7/06; B60g 11/20
[58] Field of Search ..... 280/96.2 R, 96.2 A, 96.2 B, 280/112 R, 112 A, 124 B

[56] References Cited
UNITED STATES PATENTS

| | | | |
|---|---|---|---|
| 1,987,791 | 1/1935 | Opolo | 280/96.2 R |
| 2,220,916 | 11/1940 | Schiff | 280/96.2 R |
| 2,271,505 | 1/1942 | Kolbe | 280/112 A |
| 2,341,726 | 2/1944 | Kolbe | 280/112 A |
| 3,161,251 | 12/1964 | Kraus | 280/96.2 R |
| 3,181,883 | 5/1965 | Kolbe | 280/112 A |
| 3,556,553 | 1/1971 | Kolbe | 280/112 A |

*Primary Examiner*—David Schonberg
*Assistant Examiner*—John P. Silverstrim

[57] ABSTRACT

A curvebank vehicle superstructure is supported by curvebank arms, comprising torsionally operated springs connected to rigid front and rear axles wherein the pivotal connections of the arms to the axles are spaced a selected distance longitudinally of the vehicle ahead or behind from said respective axles to secure vertical loading of each axle tending to rotate the same upon its axis and relative to the pivotal connections. Any rotational movement of the axles relative to the pivotal banking arm connections is controlled by "torque control pivots" positioned to permit curvebank motion of the superstructure and to maintain selected axle and wheel kingpin orientation. The torque control pivots in combination with the springs and the pivotal connections between the arms and the axles effectively form vehicle suspension radius rods replacing additional torque control rods previously needed in vehicles employing rigid axles.

14 Claims, 9 Drawing Figures

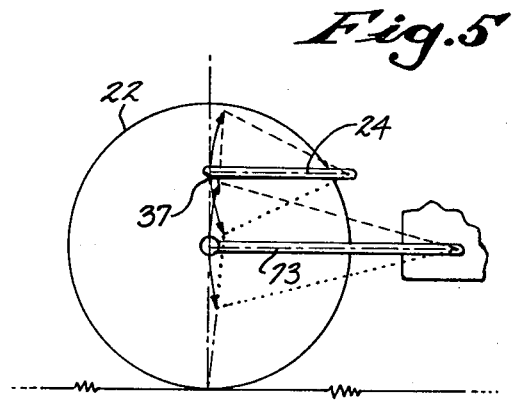
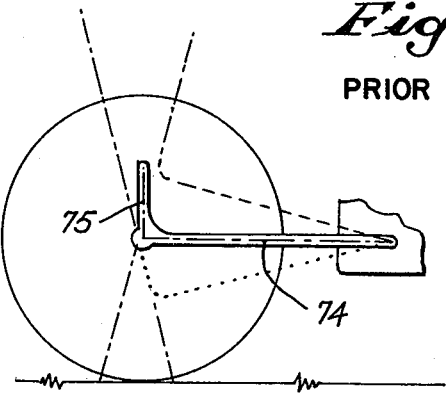
Fig. 5
Fig. 6 PRIOR ART
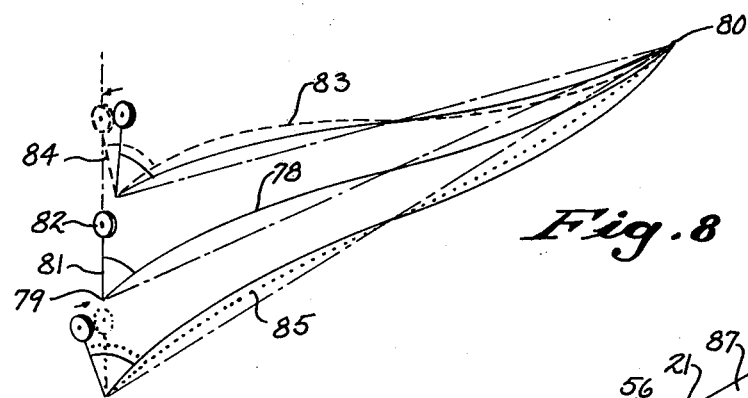
Fig. 8
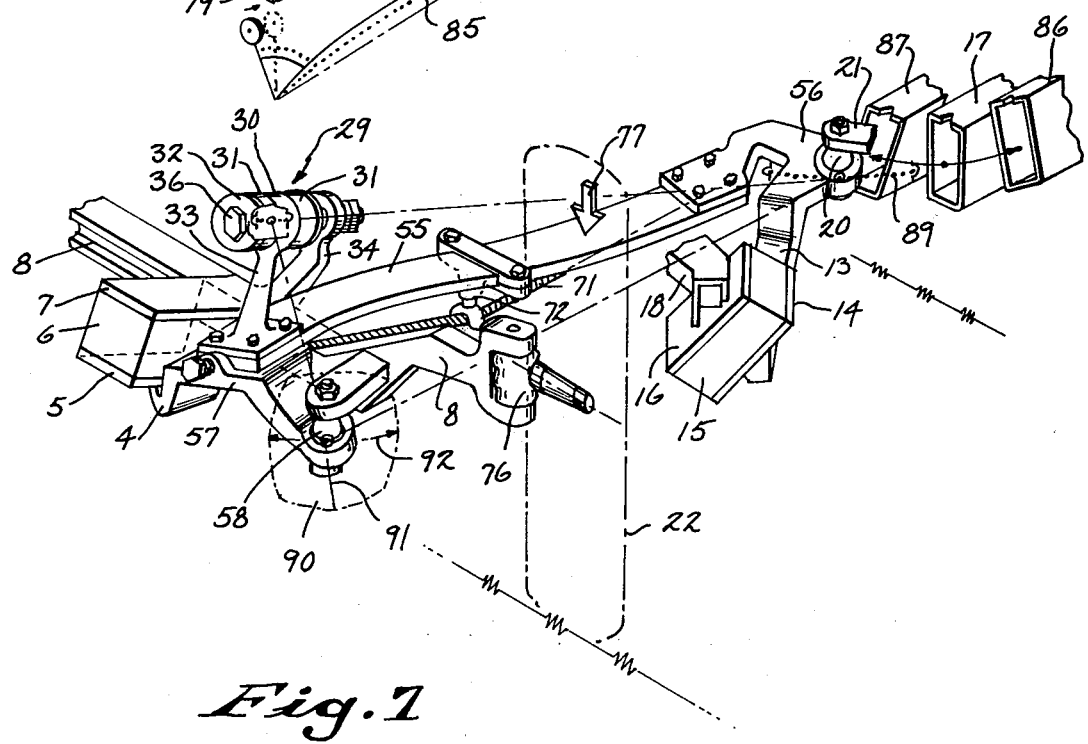
Fig. 7

VEHICLE BANKING ARM CONSTRUCTION

CROSS-REFERENCE TO RELATED APPLICATIONS

This application is a continuation in part of applications Ser. No. 185,765, filed Oct. 1, 1971, now issued to U.S. Pat. No. 3,726,542, and Ser. No. 251,831 now U.S. Pat. No. 3,826,514, filed May 9, 1972 by the present inventor, and the subject matter herein claimed constitutes an improvement upon the subject matter claimed in said co-pending applications.

BACKGROUND OF THE INVENTION

1. Field of the Invention

This invention relates to vehicle banking arm construction particularly of the type disclosed and claimed in application Ser. No. 185,765 noted above.

In vehicles employing rigid axles it has at times been customary to employ other radius rods or lower longitudinally extending guide rods in combination with upper torque control rods to control the axle position relative to the vehicle. Only by employing independent front wheel suspensions was it possible to eliminate the need for such rods in the front.

This has also been true of curve bank vehicles wherein the superstructure is supported by front and rear cooperating pairs of banking arms to effect an inward banking of the superstructure on turns.

As disclosed in application Ser. No. 185,765, noted above, it has now been found desirable to employ a rigid front axle with a curvebank vehicle.

2. Description of the Prior Art

Heretofore, in curvebank vehicles as well as in non-banking vehicles it has been customary to employ torque control rods for rigid axle structures.

Present automotive vehicles, when supported by rigid front and rear transversely extending axles, comprise as resilient means in the vast majority of cases either semi-eliptic leaf springs, frequently serving also as means of guiding the axles in their vertical oscillation relative to the superstructure, or comprise pairs of upper and lower guide links in combination with coil springs. In the early days some vehicles were equipped with a suspension system comprising the combinatin of leaf spring bundles and so-called radius rods. Such radius rods, usually extended longitudinally of the vehicle between the axles and the superstructure and also inclined in plan view with a common frame supported center pivot, and served not only as guiding means for the axle with the related leaf spring bundle extending transversely substantially parallel to and above the axle, but also as a means of keeping the axle in an upright position during vehicle static height position by having the front end of each radius rod rigidly connected with the axle.

SUMMARY OF THE INVENTION

This invention discloses the application of the radius rod principle to rigid axle supported curvebank cars and with it the discovery that certain shortcomings of the radius rod principle as applied to earlier structures can not be overcome and transformed into additional advantages and structural simplifications of the resulting curvebank car suspension.

The main object of the invention is to reduce the number of structural elements needed in the suspension system and to thereby eliminate or greatly reduce the strong caster changes typical for non-curvebanking vehicle suspensions based on the radius rod principle. A remaining share of that group of structural elements is sufficient to overcome the described deficiencies with regard to changes in caster by placing these elements in carefully selected positions. This group of elements is hereinafter referred to as a torque control pivot.

The transformation achieved is based upon the discovery that in curvebanking vehicles the vehicle frame position taken during curve ride will automatically favorably control the caster where the banking arms perform as vehicle radius rods, and that additional caster control can be secured during straight ahead ride where the structure as disclosed in the Kolbe U.S. Pat. application Ser. No. 251,831 is incorporated in the banking car suspension structure. The resulting elimination of radius rods between frame and axles and their substitution by torque control pivots selectively positioned as described hereinafter will lead to a substantial change in front axle behavior as compared to the two copending applications referred to above, together with a further simplification of structure related to improved weight reduction and space use for the workings of said structure.

In general the invention comprises the incorporation in each banking arm of a torque control pivot between the outer end of the torsion spring and the axle structure controlled by the longitudinal flexing and restricted torque engendered movement of the spring.

BRIEF DESCRIPTION OF THE DRAWINGS

The accompanying drawings illustrate the best mode presently contemplated of carrying out the invention.

In the drawings:

FIG. 5 is a diagrammatic side elevation view of an upper and lower suspension control arm, connecting in effect a front wheel with a vehicle frame structure and showing wheel caster changes during wheel oscillation as obtained with a torque control rod of U.S. Pat. No. 3,726,542, referred to above.

FIG. 6 is a similar diagrammatic side view of a prior art suspension radius arm connecting in effect a front wheel with a vehicle frame structure, and also showing wheel caster changes during oscillation, to be compared with the changes illustrated in FIG. 5.

FIG. 7 is a perspective view of a left front banking arm of FIG. 4 comprising a single leaf truss constructed to further control the related torque control pivot.

FIG. 8 is a perspective diagrammatic view related to the structure shown in FIG. 7.

DESCRIPTION OF THE PREFERRED EMBODIMENTS

Figure 1:
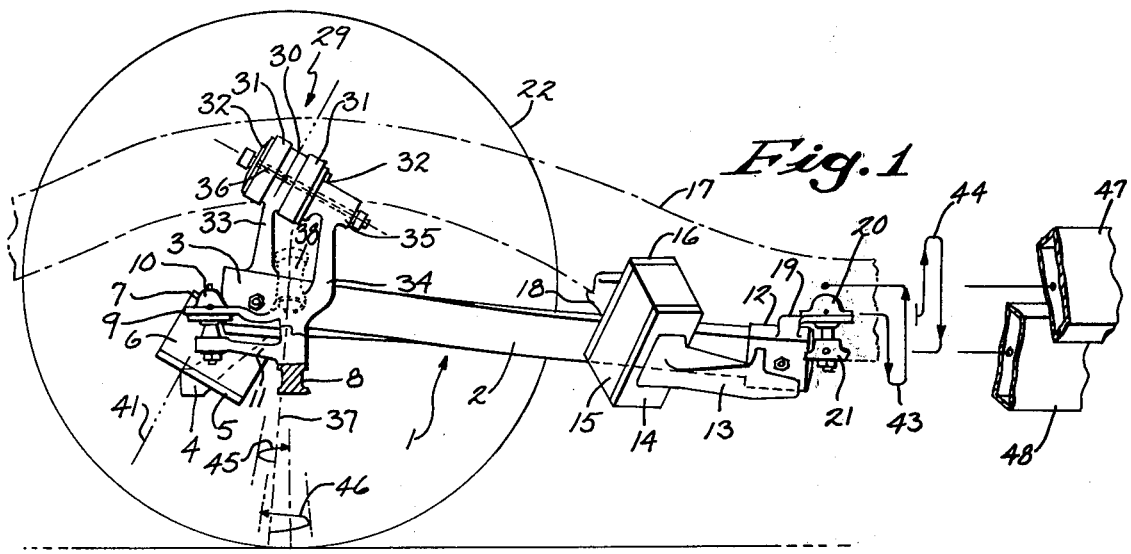
FIG. 1 is a side elevation of a left hand front banking arm illustrating the torque control pivot placed into the structure in accordance with this invention and of related frame rail positions.

FIG. 1 illustrates in side view a left hand front banking arm 1 of a curvebank vehicle, wherein the main resilient vehicle support comprises a torsionally operated spring 2 which may be in the form of a leaf bundle as disclosed in copending application Ser. No. 185,765, noted above.

The support anchor 3 at the forward or outer end of spring 2 carries the side arm 4, supporting the support plate 5 on which the multiturn cushion 6 rests.

A carrier plate 7, carried by the front axle 8 transfers the accumulated cushion load from arm 4 and cushion 6 to axle 8.

A second side arm 9 extends from the support anchor 3 toward the banking arm ball and socket joint 10 and serves as its support. The ball joint 10 is carried by the forwardly protruding axle arm 11 extending from the axle 8.

The torsion spring or leaf bundle 2 has a support anchor 12 at its rear end which carries the forwardly and outwardly extending side arm 13 supporting the support plate 14, on which the multiturn cushion 15 rests. A carrier plate 16 carried by the vehicle frame 17 transfers the accumulated cushion load of the cushion 15 by means of the bracket 18 to the vehicle frame 17.

Figure 4:
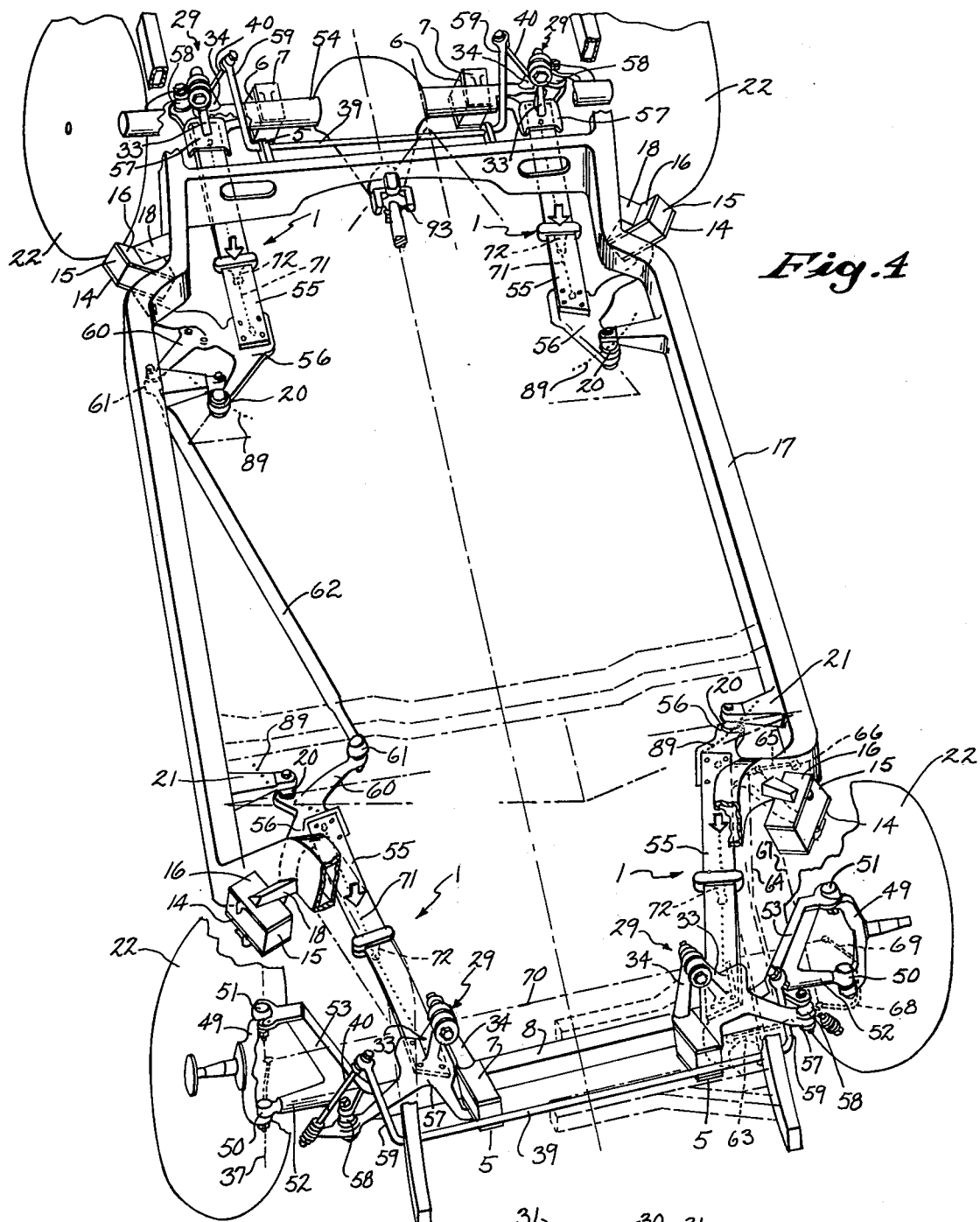
FIG. 4 is a perspective view of a vehicle chassis showing another embodiment of the invention with the superstructure in a normal upright position.

A second side arm 19 extends from the support anchor 12 toward the ball and socket joint 20, serving as its support. This ball joint 20 is carried by the arm 21 extending inwardly from the vehicle frame 17. Each banking arm 1 as a whole rests with its forward end on the axle 8 which in turn is carried by the wheel 22 adjacent thereto and the respective wheel positioned on the other side of the vehicle as shown in FIG. 4.

The structure described so far would permit the front axle 8 and with it the wheels 22 and sections of the other members carried by it to turn bodily in response to the upwardldy directed wheel load force counterclockwise about a transversely extending axis line 23 (see FIG. 3) drawn from the ball and socket joint 10 illustrated to the corresponding ball and socket join located near the other end of the axle 8. Such a turn of the axle 8 about the line 23 is resisted in previously disclosed banking arm structures by an upper torque control rod 24, shown in FIG. 5 as extending substantially parallel to the leaf spring bundle 2 and located a selected vertical distance above said bundle.

The torque control rod 24 was carried by a forwardly located pivotal connection supported at one end by vertically extending arm from the axle 8, and at the opposite end by a pivotal connection carried by a bracket connected to the vehicle frame 17. The torque control rod 24 transfers the described force from the axle 8 to the frame 17.

The present invention discloses a new way for such force transfer thereby eliminating the need for a torque control rod. A single pivot 29, hereinafter referred to as a torque control pivot and comprising a center ring 30, two half bushings 31 of resilient material and two end plates 32 is carried by an arm 33 extending between said center ring and the support anchor 3 or the related side arm 4 or 9. A substantially vertically extending axle carried pivot support arm 34 is shaped in its end section 35 to receive an assembly bolt 36 extending through the assembly of the torque control pivot 29.

A preferred vehicle static height position of the kingpin axis line 37 is outlined in FIG. 1 together with the related kingpin hinge sleeve 38.

Figure 2:
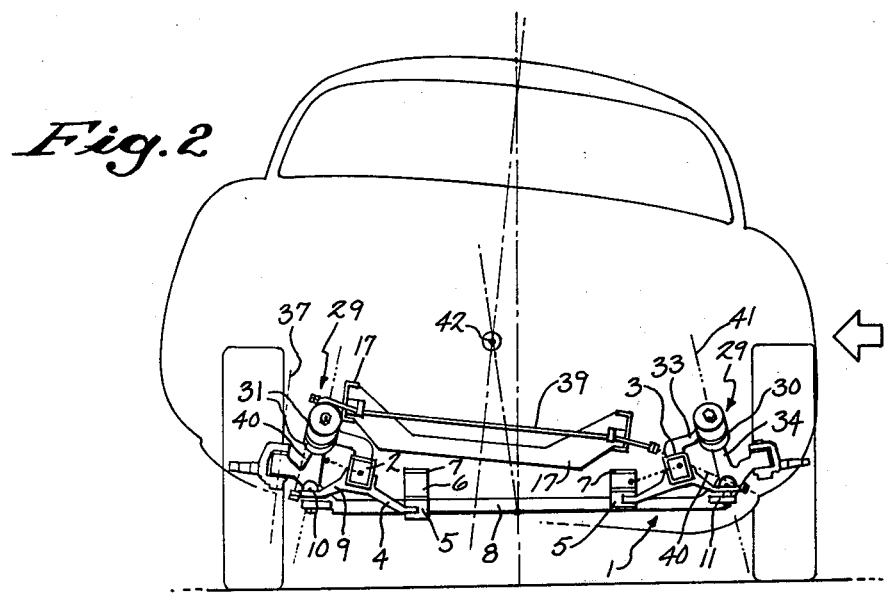
FIG. 2 is a schematic front elevation of the front end of the vehicle having its superstructure mounted as shown in FIG. 1 and turned into a roll banked position.

Before describing the preferred placings and the related various operations of the torque control pivot 29, FIG. 2 is herewith referred to, illustrating in front elevation the front support of a curvebank car, with its superstructure moved into a curvebanked position. Identical numerals are attached to the related structural members as illustrated in FIG. 1. A sway bar 39 and related sway bar shackles 40 are also shown and the two front banking arm effective axes 41, created by the turn shear motion of the respective multiturn cushions 6 about the ball joint 10, are shown in dash-dot outline.

The mass center of the superstructure has shifted into position 42, under side pressure from the centrifugal force, the superstructure on the curve outside has risen, the superstructure on the curve inside has lowered itself while the two control pivots 29 have substantially maintained their positions, relative to the front axle 8, an important fact in light of the description of the functions and movements of the mechanism following hereinafter.

Figure 3:
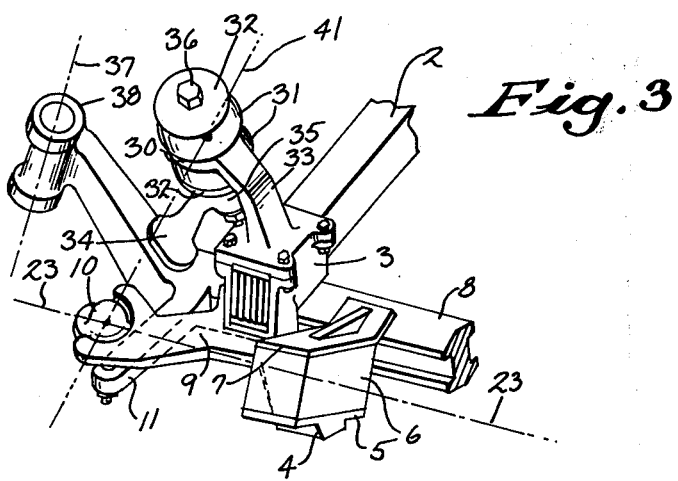
FIG. 3 is a perspective detailed view of the connection of a right hand front end banking arm to the vehicle front axle according to this invention.

FIG. 3 gives an enlarged three-dimensional perspective of the forward section of the banking arm 1, with identical numerals as given in FIGS. 1 and 2.

Referring to the front effective banking arm axes 41, the positioning of the torque control pivot 29 has to be selected one so as not to interfere with the free banking swing of the superstructure during curve ride. As disclosed in the cross references cited above, the end support of the banking arms, comprising ball joints and multiturn cushions in general, form so-called banking universal joints each with one axis thereof extending between the center of the related ball joint and the center of the multiturn cushion, and the other universal joint axis here enumerated 41, extending through the center of the ball joint and perpendicular to the plane of the related support plate 5 supporting the multiturn cushion 6. Any pivot located along said second axis 41 will not intefere with the desired banking swing and the angular change between banking arm 1 and axle 8. The position of the center of the torque control pivot 29 into or close to said line 41 will secure interference free functioning of the apparatus.

The elimination of the former upper torque control arm 24 with the intorduction of the torque control pivot 29 will classify the remaining lower control arm represented by torsion spring 2 as a true radius rod. In general, a radius rod, in combination with a steered rigid front axle, tends to change the caster position of the related kingpin the same angular amount as it changes its angular position during wheel oscillation relative to the road. Such change is resisted by the torque created along the length of the rigid axle, during curve ride in which one wheel moves up and the other wheel of the pair moves down relative to the frame, unless resiliency is provided in the connections.

An objection to the employment of a rigid front axle in vehicles heretofore has been that where rigid axle kingpins usually have about three degrees positive caster setting relative to a straight upright position of the related axle in static position, the caster on the curve outside might more than double, and on the curve inside it might become up to 2° negative. Extreme understeer is thereby created during curve ride since not alone the leverage from the wheel to road contact point to the nearest point along the kingpin caster axis will double, but the wheel load on the curve outside will greatly increase as well, creating the undesirable tendency of the wheel to turn forcefully about its kingpin interfering with the steering direction set by the driver.

In curve bank cars, however, the frame supported end of the radius rod structure, which with the present invention in effect constitutes the banking arm structure, will not lower itself but will rise during curve ride, where positioned on the curve outside, together with that side of the superstructure. The path of the ball joint 20 in normal downward movement with adjusted curvebank upward movement and resulting surplus upward movement as occuring on the curve outside is illustrated and enumerated 43 in FIG. 1. A similar reverse movement takes place on the curve inside for that ball joint 20 and is in its path enumerated 44.

The corresponding kingpin directional changes are marked for the downwardly extended kingpin line 37 as 45 for the curve outside and 46 for the curve inside in FIG. 1. The vehicle frame rail positions 47 and 48 as shown near the ball joints 20 also relate to the curve outside and the curve inside respectively. The resulting various axle positions as appearing in side view are hereinafter referred to as axle-caster.

The most obvious advantages of the arrangement are the elimination of the former torque rod 24 altogether and the swing space needed for its operation, thereby securing the availability of space needed for the engine side attachments as well as a reduction in number and weight of parts. The torque control pivots 29 now form a part of that structure which can be preassembled outside the chassis. This will reduce the number of attachment points of the suspension to the frame.

While during curve ride of the curvebank vehicle described above employing a leaf bundle as the torsion spring 2, automatic repositioning of the kingpin inclination occurs, equalizing the force times leverage moments created by side forces, and securing greatly increased steering control for the driver, during straight ahead ride over an uneven roadbed, possibly full of pot holes, the radius rods will with wheel oscillation still change the kingpin positions in a seemingly unfavorable manner.

However, without centrifugal force created side pressures effective on the system, little steering interference will occur. The wheels will follow the course set by the driver. Furthermore, short roadbed created shocks will give little time for the wheels to change their direction even about negative, caster set kingpins.

In addition, the four multiturn cushions active on each axle and resisting with their shear deflections the desire of the axle to move out of center will also due to their great damping capacity reduce any self steering tendencies of the assembly caused by extreme caster positioning of the related kingpins.

The positioning of the frame carried multiturn cushions 15 closer to their respective axles than the related frame supported ball joints 10 will also have a considerable centering effect on the axles. Modern broad tread tires will contribute to keep the suspension system comprising torque control pivots under control at all times.

Torque control pivots may also be incorporated into the rear rigid axle structural assembly, similar to that illustrated in FIGS. 1 to 3 for the front, and similar rules for their positioning apply. In both cases, even a single torque control pivot per axle is sufficient where increased brake torque forces are deemed acceptable to be absorbed by the axle, which still will be kept in a three point determined plane.

As pointed out above, the positioning of the torque control pivot 29 along the effective front banking arm turn axis 41 will result in the elimination of the former upper torque rod 24 structure and its related swingspace, and will in curvebank cars greatly reduce the change of the kingpin inclination normally resulting during curve ride in radius rod suspension systems, and therefore greatly reduce dangerous interference with steering to be compensated for by the driver.

During straight ahead ride employing leaf bundle torsion springs, however, the torque control pivot 29 mechanism will have little effect on the change of kingpin inclination from that typical for radius rod suspension systems.

The available banking car suspension system as developed by the present inventor and illustrated in application Ser. No. 251,831, cited above lends itself to the incorporation of a torque control pivot.

In this new combination of structure, the selected kingpin position and axle caster can be maintained to a greater degree than before, during both wheel oscillation and vehicle curvebanking and in all combinations of the two occurrences.

FIG. 4 illustrates such a banking car chassis comprising four banking arms, each including as a resilient operating means the newly devised single leaf spring arrangement with a truss creating tension cable as disclosed in the application Ser. No. 251,831.

The numerals applied in FIG. 4 are those cited in FIGS. 1 to 3 where substantially identical parts or functions of parts are employed or maintained. Otherwise, added numerals are applied.

FIG. 4 illustrates a vehicle body or superstructure having a chassis or body support frame 17 supported by four wheels 22 on the road. The front wheels 22 each are supported by a wheel spindle member 49 connected by a lower ball joint 50 and an upper ball joint 51 placed along the kingpin line 37 to the forked ends 52 and 53 of the rigid front axle 8.

The rear wheels 22 are carrying a rigid rear axle housing 54. The front axle 8 and the rear axle housing 54 each are supporting the respective ends of a related pair of banking arms 1, which are supported at their other ends by the frame 17. Each banking arm 1 comprises at least one torsionally operated single leaf spring 55 connected at one end to a support bracket 56 for the support of the ball and socket joint 20 which connects said end of the banking arm 1 to the frame 17. The other end of the respective leaf spring 55 is held by the support bracket 57 for the support of the ball and socket joint 58 which connects said end of the banking arm 1 to the rigid axle 8 in the front and to the rigid axle housing 54 in the rear of the vehicle.

Each support bracket 56 has an arm extending substantially horizontally and outwardly in a direction toward the nearest wheel 22 at a length of about one-third to one-half of the length of the related spring 55 in accordance with the geometry pattern selected for the operation of the device. The support bracket 56 carries a rectangular support plate 14 positioned inclined at an angle of approximately 45° relative to the road and to the longitudinal vertical center plane of the vehicle with its lower edge being closer to said center plane than its upper edge and with both edges arranged substantially parallel to the road. Each plate 14 supports a multiturn cushion 15 fabricated as a substantially rectangular block of polyurethane based material and which rests against an upper carrying plate 16 which is connected by the bracket 18 to the frame 17.

Each support bracket 57 extends substantially sidewardly and carries a rectangular support plate 5 positioned inclined at an angle of about 32 degrees relative to the plane of the road and substantially parallel to the direction of the longitudinal vertical center plane of the vehicle and is with its lower edge located closer to the respective rigid axle structure than its higher edge. Each plate 5 supports a multiturn cushion 6 shaped similar to the cushion 15 and resting against the carrier plate 7 carried in effect by the respective rigid axle structure located nearest to it.

A straight line representing each banking arm 1 is drawn between the centers of the corresponding ball joints 58 and 20. Each frame end supports a sway bar 39 with the longitudinally extending sway bar arms 59 pivotally connected by resilient bushings to the sway bar shackles 40 which are connected to the respective support brackets 57, here connected by the ball and socket joints 58 to the axle closest to them.

Each support bracket 56 located on one side of the vehicle also carries an arm 60 sidewardly extending in a direction opposite to each other in relation to the two end sections of the vehicle, whereby each of said arms carries a ball and socket joint 61 on its free end, supporting the ends of a front to rear tie rod 62 arranged to secure lateral operation in unison of the front and rear pair of banking arms during the roll turn of the superstructure into a banked position.

FIG. 4 further illustrates schematically only, the front wheel steering linkage which is not considered a part of this invention but is planned to be presented in its inventive aspects in a separate application for patent. The linkage comprises the lever 63, which might be considered the Pitman arm of a steering gear mechanism enclosed by a gear housing mounted to the frame 17 to locate the arm as illustrated.

The lever 63 is pivotally connected at its outer end to a tie rod 64 supported by the lever arm 65 which is pivotally supported by the pivot 66 to the frame 17. The lever arm 65 carries also the backward end of the steering drag link 67 whose forward end is connected to the spindle arm 68. The spindle member 49 also carries the steering arm 69. A steering cross tie rod 70 extends between the steering arm 69 and a corresponding steering arm 71 located at the other side of the vehicle.

All tie rod and drag link ends of the steering mechanims are connected to their respective support arms by ball and socket joints.

Each torsionally operated leaf spring 55 of the banking arm suspension illustrated in FIG. 4 would tend to bend downwardly with its center section, due to the pressure exerted by each related multiturn cushion 15 which also winds up each leaf in torsion from its frame supported end, whenever the front axle 8 moves upwardly, parallel to itself, since the cushions 15 of the related pair of banking arms, positioned between the respective ball joints 58 and 20, are spaced farther apart from each other than the longitudinally extending connecting lines drawn between the ball joints 58 and 20.

The torsional windup of each leaf spring will be greatly interfered with where the spring leaf 55 is permitted to take the downwardly bent shaped position.

For this reason, a truss cable 71 has been added to each banking arm, positioned below the respective spring leaf and extending from one end of the spring leaf 55 or its related support bracket 56 to its other end or to the related support bracket 57. A truss column 72, preferably of adjustable height, is placed between the center section of the spring leaf 55 and the truss cable 71 in order to form a structural triangle created by the leaf 55 and the two half sections of the truss cable 71. The pressure exerted by the multiturn cushion 15 will now create compression along the length of the spring leaf 55 and tension in the two half sections of the truss cable with the truss column 72 resisting downward movement of the center section of the leaf spring 55.

Where, without the truss arrangement, an approximately 5 inch downward bending deformation of the leaf would take place, with introduction of the truss cable arrangement, the center section of the leaf cannot move downwardly at all and the respective half section of the leaf will bend downwardly only about three-eighths of an inch on the frame supported end and similarly upwardly on the axle supported end, giving the leaf an "S" shape as appearing in side elevation. This deformation when related to a leaf thickness of one-half inch will not be detrimental to the desired torsional windup of the leaf.

It is the S bending of the spring leaves 55 illustrated in FIG. 4 which offers a means to control the caster of the kingpin line 37 during wheel oscillation, and maintains, in combination with a newly selected positioning of the torque control pivot 29, control of the selected caster during vehicle curvebanking, in a manner different from that described for the embodiment of FIGS. 1 to 3.

FIG. 4 illustrates the incorporation of the torque control pivots 29 each as positioned in effect between the related axle and the support bracket 57 which carries the end of the spring leaf 55 located near the related axle. The pivot 29 is placed between the substantially vertically extending axle carried arm 34 and the arm 33 carried by said bracket 57 and constructed as shown in, and described for FIG. 1.

The further description of FIG. 4 is hereinafter supported also by the explanatory diagrams of FIGS. 5 and 6, presented to clearly outline the difference between, and the use of an upper torque arm 24 working together with a lower suspension control arm 73 (torsionally operated resilient spring means 2) as illustrated in side elevation in FIG. 5, and the use of a single lowly placed control arm 74 hereinafter referred to as a radius rod as shown in FIG. 6. The arms are shown also in both FIGS. 5 and 6 in dash and dot lines for somewhat extreme deflection positions.

As applied to a vehicle front axle suspension, the kingpin line 37 shown in FIG. 5 and representing the spindle member, which carries the wheel 22 extends between the forward end of the upper control arm 24 and the lower control arm 73. An upward movement, as well as a downward movement of the wheel 22 will reposition the respective upper and lower ends of the kingpin line 37 along nearly identical arcs, and only a small change out of the vertical position of the kingpin line 37 will occur during such movements.

In FIG. 6 the respective kingpin line can be considered the axis of a vertically extending arm 75 rigidly connected to the horizontally extending arm 74. A swing of arm 74 about its frame supported end upwardly or downwardly will move the kingpin line arm 75 out of its vertical position into a position inclined to the same large angular degree relative to the vertical as the arm 74 will be inclined in relation to the horizontal.

During upward move of the kingpin line arm 75 strong positive caster results; during downward move of the line 75 strong negative caster results.

FIG. 7 shows in enlarged perspective illustration the single left front banking arm 1 of FIG. 4, including a caster and torque control pivot 29 positioned in accordance with this invention. A single torsionally wound up spring leaf 55 extends from the front axle 8 backwardly to the frame 17 and has its front end connected by the support cross member 57 to the axle supported ball joint 58 located between the front end of the leaf 55 and the front wheel 22. The cross member 57 comprises the arm 4 which extends sidewardly toward the center section of the axle 8 and carries the support plate 5, which supports the multiturn cushion 6. This cushion rests against the carrier plate 7 carried by the front axle 8. The cushion is thereby located between the front end of the spring leaf 55 and the vertical longitudinal center plane of the vehicle.

Both the centers of the ball joint 58 and the cushion 6 are positioned a selected distance forwardly of the axle to secure and maintain axle rotational pressure about a line connecting the two ball and socket joints 58 of the front pair of banking arms 1, in one direction at all times. The axle 8 is at its outer end section shaped to carry the kingpin spindle member 76 corresponding to member 49 in FIG. 4. The rear end of the spring leaf 55 is connected to the support cross member 56 carrying the ball and socket joint 20 which is through the arm 21 supported by the frame 17. The support member 56 comprises the support arm 13 which extends forwardly, sidewardly, and somewhat downwardly and supports at its end the support plate 14 which in turn supports the multiturn cushion 15, resting against an upper carrying plate 16. A bracket 18 connects the plate 16 with the frame 17. The multiturn cushions 15 and 6 are positioned in their angular placings in accordance with a geometry pattern described for the arrangement of the structure illustrated in FIG. 1.

A truss cable 71 is positioned below the spring leaf 55 and extends from one end of the leaf or its related support cross member 57 to its other end or its related support member 56. Somewhat forwardly of the center section of the spring leaf 55 and the truss cable 71 the truss column 72, preferably of adjustable height, is placed and clamped to the spring leaf 55 in order to form a structural triangle created by the leaf 55 and the two half-sections of the truss cable 71.

The pressure exerted by the multiturn cushion 15 and in particular by its related force component active as a substantially vertically positioned and downwardly effective force is graphically indicated in FIG. 7 by the arrow 77. This force component causes a downward bend of the leaf section positioned closest to the frame supported end of the spring leaf 55, and therewith an upward bend of the forward half of the leaf.

The amount of bending deflection of leaf 55 may only approximate the thickness of the selected leaf itself in the center of each half section of the spring leaf, and can be controlled in its amount by shifting the truss column 72 more or less out of its initial center position, and relate its new position to the effective loading caused by the force component represented by the arrow 77.

As pointed out in the related application by this inventor cited above, the spring leaf 55 will take an "S-ing" deformation as appearing in side elevation. Such deformation will not be detrimental to the desired torsional windup of the leaf 55 and in fact, the torsional windup itself will more strongly resist high frequency bending vibrations of the leaf, which might otherwise occur.

With the structural improvements desired with this invention in mind, it is the relationship between the two half lengths of the spring leaf 55 and their amount of S bending which is of importance since it establishes the angular degree of changed inclination, under which each end of each half spring section approaches, and actually determines the newly taken position of the related support cross member 57 and, of lesser importance, the support member 56, and in particular the position of the truss column 72 itself.

With increased loading of the truss as represented by the arrow 77 which might result from an upward movement of the related wheel 22 relative to the vehicle frame 17, the inclination of the leaf end section will increase; with decrease in loading it will decrease. It is this change in inclination of the front end of the torsionally operated leaf spring 55 during wheel oscillation, which furnishes the means to activate the forward or backward repositioning of the torque control pivot 29, as desired.

FIG. 8 is a schematic perspective illustration of this condition. The longitudinally extending center axis line 78 of a spring leaf is shown as connecting the ends 79 and 80 of said line 78 and as having taken the S-ing shape normal for such a leaf during vehicle superstructure static height position. A line 81 representing a torque control pivot operating arm extends vertically and forms a rigid part of the forward end of the S shaped center axis line 78. A small circular plate 82 is shown at the end of the arm 81 and represents the torque control pivot 29.

An upward movement of point 79 turning about point 80 resulting from a related upward movement of the wheel, will take the loaded correspondingly S shaped spring leaf representing center axis line 78 with it, and since upward movement of a wheel within the system represents increase in loading, will add to the bending deflection of line 78 as indicated by the dash line 83 extending above line 78 in the forward half of line 78 and below line 78 downwardly in the rearward half of line 78. The additional S-ing deformation will push the arm line 81 with its plate 82 forwardly into position 84.

With an assumed downward movement of the wheel, a reduction in spring loading and in S-ing of the center axis line 78 takes place as indicated by the dotted line 85 extending below line 78 in the forward half of its main outline and above it in its rearward half. The reduced S-ing represented by the line 85 will push the arm line 81 backwardly. Both respective movements are indicated by the short arrows at the top of the respective arm positions. Corresponding circular angle lines in full, dashed and dotted arcs are shown as connecting the related arm positions with the respective S shaped spring leaf outlines, whereby the lines drawn in full represent the static height position, where drawn in dash outline the wheel up, and where drawn in dotted outline the wheel down conditions.

Reference is here made again to FIG. 6 which shows that in a basic radius rod suspension arm structure a wheel up movement results in a substantial change from zero caster to positive caster, a wheel down movement in a change from zero caster to negative caster. Both changes are undesirable. Too much positive caster still creates in road height a lever arm extending between the wheel to road contact point and the kingpin line to road intersecting point. A large side force active on the wheel to road contact point especially during curve ride, combined with this increased lever arm length creates a turn moment which strongly interferes with the driver's effort to steer the car. As pointed out in the earlier part of this disclosure, negative caster may actually tend to position the wheel to road contact point ahead of the kingpin line to road intersecting point, thereby creating at least a tendency of the wheel to snap into a direction all around the kingpin in search of its normal position of following the kingpin to road intersecting point. Negative caster also tends to develop wheel shimmy forces.

FIG. 7 illustrates as a basic new structure of this invention the torque control pivot 29. The construction of the pivot is substantially identical to that shown in FIG. 1 and identical numerals have again applied to the drawing. However, due to the use of a single spring leaf capable of S bending the arm 33 is now connected to the spring leaf 55 in such a way that the change in bending inclination during wheel oscillation is transferred by the arm to secure pivot repositioning in order to compensate for undesirable caster change during vehicle straight ahead ride-wheel oscillation as it would otherwise occur in the embodiment illustrated in FIG. 1.

Before describing the operating in detail, a second operation of the structure shown in FIG. 7 is taking place simultaneously and has to be considered and explained.

During curve ride of the vehicle turning to the right the superstructure with its frame rail 17 lifts itself away from the roadbed on that side into the frame rail position 86, with the corresponding lateral rail shift toward the curve outside, while during a turn of the vehicle to the left the frame rail 17 lowers itself toward the roadbed into position 87 with a corresponding lateral rail shift toward the curve inside. The frame supported end of each banking arm follows this motion. In each case, the torsionally operated spring leaf 55 forced into increased S-ing due to increased loading on the curve outside and into decreased S-ing due to decreased loading on the curve inside, pushes the arm 33 forwardly on the curve outside and backwardly on the curve inside. These arm repositionings, corrective during straight ahead ride will now, in combination with raising and lowering of the rear ends of the correpsonding banking arms during curve ride for a second time have to be adjusted in order to maintain constant caster, equal to the one selected and set for straight ahead vehicle static height position.

The means to so adjust the system is to reposition the torque control pivots 29 out of their previously selected positions as shown in FIG. 1 and designed there to operate for banking arms with bend resisting spring leaf mechanisms, and which located them along the front banking arm forward end banking arm axis 41 into a position laterally away from said axis 41 and approximately above the front end of the spring leaf 55, as also shown in FIG. 4.

For the triangle outlined by connecting the ball joints 58 and 20 with each other and each with the center of the newly positioned torque control pivot 29, a move of the ball joints center 20 about the corresponding ball joint center 58 along the travel path 89 traveled by the frame supported ball joint 20 during curve-banking of the superstructure will pull the point 29 of the triangle backwardly when point 20 moves outwardly and upwardly together with the frame rail 17 movement into its position 86, which is the vehicle right turn curve outside position, this movement compensating for the forward movement of point 29 due to increased S-ing in response to increased loading of the spring leaf 55 on the curve outside. Corresponding movements and repositionings for the banking arm located on the curve inside give corresponding corrections for the torque control pivot 29 on that side.

Many means of position selection and adjustment within the system are available to secure exact travel paths and amounts. For instance, against caster disturbance during wheel oscillation by the proposed method of corrective pivot positioning, the amounts of spring leaf S-ing can be influenced by the shifting of the truss column 72 forwardly or backwardly relative to the arrow 77, or by re-dimensioning the ratio of width to thickness of the leaf 55 while still maintaining selected spring and wheel rates during the wheel windup process, or by changing the vertical distance of the torque control pivot 29 from the axle 8 in the vertical plane.

In coordination with these corrected steps, a shifting of the torque control pivot 29 closer to the wheel 22 will reduce the corrective travel length of the pivot in its longitudinal direction, while a move of pivot 29 further away from the respective wheel will increase it.

The torque control pivot 29 constructed as illustrated also in FIG. 1 comprising two polyurethane bushings 31 sandwiched between two enclosure plates 32 can now be adjusted rather tightly, since during wheel oscillation no significant angular change in position of one plate relative to the other will occur because such change is entirely absorbed by the S-ing of the spring leaf. The pivot package as a whole just moves forwardly and backwardly.

During the curvebank movement of the banking arm 1 shown in FIG. 7 an angular change in transverse position of arm 33 and its center ring 30 relative to the closing plate 32 will occur, but it will be small, since the distance between the ball joints 58 and 20 will always be considerably greater than that between the pivotal connections of a typical upper torque arm such as arm 24 shown in FIG. 5. Furthermore, one curvebank arm torque control pivot 29 replaces the two pivots at the opposite ends of rod 24 and each of which have substantially greater angular motion. There also might occur one hundred vertical oscillation movements of the wheels, many extremely quick, for each relatively slow superstructure banking turn pivot movement.

For this reason, the torque control pivot 29 can be constructed firmer to provide excellent holding power for the desired upright axle caster position of the axle 8.

The use of two torque control pivots 29 per axle will keep the axle itself essentially freer of torque forces. Desirable reduction of the unsprung weight share of the front wheel support assembly will result, although a single torque control pivot per axle will be sufficient to secure a constant upright axle position.

In FIG. 7 a field of possible movements 90 is outlined within which the ball joint 57 can take positions. Determined in its size by the predominantly vertical oscillation travel path 91 and the lateral curvebank travel path 92 and by the selected wheel movement stops (not shown) this field 90 illustrates the amount of caster control and its maintenance secured through the introduction of the torque control pivot in accordance with this invention.

It is realized that the forces tending to rotate the axle 8 about the line 23 and controlled by the torque control pivot tend to have a counter S-ing effect on the respective leaf 55. However, the respective force times lever arm moments constitute only about one-tenth of the forces exerted on the leaf and originating from the respective multiturn cushion 15 pressures. They can be considered during the positioning of the related elements as influencing such S-ing.

The arrangement of the torque control pivots as illustrated in and described for FIG. 7 clearly adds support to the claim by this inventor as expressed in the references cited above that, properly constructed, rigid passenger vehicle front axles can advantageously replace front wheel supports of the independently suspended kind.

FIG. 4 also illustrates the use of torque control pivots 29 positioned generally as illustrated and previously described for FIGS. 1 to 3 of this disclosure, and now shown as incorporated within the rear vehicle suspension. Caster control does not need to be given particular consideration for the rear banking arms 1 since the larger rear axle housing is strong enough to transmit torque forces along its transverse outline. The torque forces will then have to be absorbed by the related torque control pivot bushings 31. Where, as shown in FIG. 4, each rear banking arm 1 has a torsionally operated single leaf spring 55, reinforced by a truss cable 71 and a truss column 72 as the main resilient support of the vehicle, it is advisable to set the related truss column 72 in line with or as close as possible to the force component arrow 77 to thereby substantially eliminate leaf spring S-ing altogether, and to position the axle supported ball and socket joints 58 somewhat higher from the road than the frame supported ball joints 20, since then a desirably greater turn of the axle housing 54 will occur, than of its centrally and more forwardly placed, differential housing carried drive shaft universal joint 93, during upward move of the axle. A lower vehicle floor and drive shaft tunnel may thereby be employed.

The elimination of upper torque rods will make an increase in the size of the rear luggage compartment possible.

Figure 9:
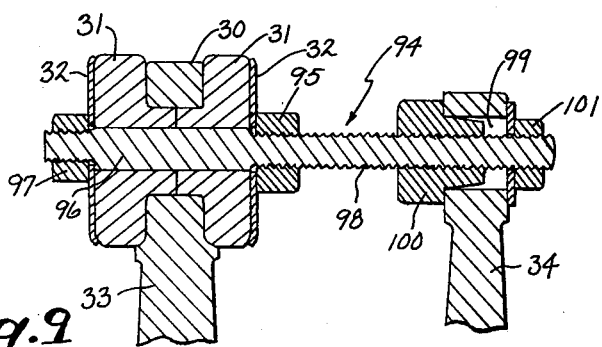
FIG. 9 is a sectional detail view of a torque control pivot assembly bolt designed to adjustably establish vehicle static height axle caster.

FIG. 9 illustrates a modification of the torque control pivot assembly bolt 36 as shown in FIG. 1 and now in its changed outline enumerated 94. Related structural members are given numbers identical to those in the FIG. 1 illustration.

The bolt 94 comprises in its central section a shoulder nut 95 preferably with a hexagon circumference, against which from the forward end the control pivot leans, which comprises the two half bushings 31 of complemental spool shape and the center ring 30 forming a part of the arm 33, as well as the two end plates 32. The forwardly extending part 96 of the bolt 94 is not threaded where covered by the bushings 31, but has a short section of reduced diameter on its most forward end threaded to receive a closing nut 97.

The rearwardly extending part 98 of the bolt 94 is threaded and extends through a circular opening 99 of a diameter larger than the bolt diameter and provided in the upper end of the arm 34, extending upwardly from the axle 8. An adjustment nut 100 resting against the upper end of the arm 34 and preferably extending partly into said opening 99, is carried by the threaded part 98 of the bolt 94.

A turn of the adjustment nut 100 will either elongate or shorten the distance between the arms 33 and 34 to the extent to which a desired axle caster during the static height position of the vehicle is secured by the selected amount of adjustment. A closing nut 101 might be provided, for safety reasons, at the rearward end of the bolt 92, although in the pivot structures illustrated in the figures of this disclosure a permanent pressure from the arm 34 toward the arm 33 will be present.

A simple easily accessible device for axle caster setting has been secured with the addition of one single nut 100 to the torque control pivot 29. The arrangement can be considered a further advantage of the pivot assembly as a whole and its incorporation into a curvebanking automobile, as well as an additional reason to employ a rigid front axle in such vehicles.

Various modes of carrying out the invention are contemplated as being within the scope of the following claims particularly pointing out and distinctly claiming the subject matter which is regarded as the invention.

I claim:

1. In a vehicle having a superstructure and a banking support connecting the superstructure, at its forward end to a wheel spindle carrying, wheel supported, rigid front axle structure, and at its rearward end to a wheel supported rigid rear axle structure, said banking support comprising a plurality of pairs of cooperating roll banking arms, each said roll banking arm including a longitudinally extending torsionally operated resilient spring means a first support member mounted on said spring means at its inner end, a first ball and socket joint connecting said first support member to said superstructure, a second support member mounted on said spring means at its outer end, and a second ball and socket joint connecting said second support member to the respective rigid axle structure, said second support member including a side arm bearing at its end against an axle supported resilient multiturn cushion of polyurethane based material disposed near the outer end of the resilient spring means and said first support member including a side arm bearing at its end against a resilient multiturn cushion of polyurethane based material supported by the superstructure and disposed intermediate the length of the spring means; wherein the improvement comprises a torque control pivot means pivotally interconnecting at least one spring means of each pair of cooperating roll banking arms to the respective axle structure, said torque control pivot means being mounted on said at least one spring means near the outer end thereof to secure and control the orientation of said respective axle structure and to carry the axle torque pressures to the superstructure through said resilient means.

2. The vehicle of claim 1 wherein said torsionally operated resilient spring means is constructed to resist bending deformation in both the related longitudinally extending vertical and the transversely extending horizontal plane and wherein said torque control pivotal means interconnecting the related axle structure and the spring means of one of its related banking arms is placed a selected substantially vertically extending distance above said axle and along the related banking arm turn axis extending through the center of the ball and socket joint.

3. The vehicle of claim 2, wherein the suspension and the resilient support means for the superstructure also comprise at least one transversely extending sway bar carried by the superstructure and operated by a pair of inclined sway bar shackles connecting substantially longitudinally extending sway bar arms to the related rigid axle structure, and wherein the suspension means additionally comprise a tie rod operably extending longitudinally between one roll banking arm in the front of the vehicle and one rear roll banking arm to secure track holding of the pairs of the front wheels relative to the rear wheels.

4. The vehicle of claim 2 wherein each said torque control pivot means comprises a carrier arm extending substantially vertically from the related axle structure, a support arm extending substantially vertically from said second support member, a bolt secured to the upper end of said carrier arm, and cushion means pivotally mounting said support arm upon said bolt for limited universal movement relative thereto.

5. The vehicle of claim 4 wherein the selected vertically extending distance of the torque control pivot above and the substantially transversely extending distance away from said axle carried banking arm ball and socket joint and its related banking arm turn axis are coordinated in the amounts of their movements during the curvebanking turn of the superstructure to cause a backward move of the torque control pivot whenever the related superstructure supported banking arm ball and socket joint lifts itself away from the road during its sideward and outward move as occurs on the curve outside during the vehicle turn-ride.

6. The vehicle of claim 4 wherein a backward move of the torque control pivot caused by a lowering of the frame supported banking arm ball joint on the curve inside during a turn of the vehicle is compensated for by a corresponding forward move of the torque control pivot secured by the selected positioning of the torque control pivot relative to the vehicle axle.

7. The vehicle of claim 2 wherein said torsionally operated resilient spring means comprises at least one spring leaf of substantially greater width than thickness, placed in a substantially horizontal plane and carrying in its central district a vertically positioned truss column supported by a truss cable means extending from one end of said spring leaf, resting from below against said truss column and extending from there to the other end of the leaf, and wherein said truss column is positioned along said spring leaf to coincide with the downwardly directed force exerted by the respective force component of the pressure active within said superstructure carried multiturn cushion, said downwardly directed force transmitted by said column into the two longitudinally extending truss cable sections, exerting tension within the cable and compression in the spring leaf without creating significant bending deformation in the spring leaf.

8. The vehicle of claim 1 wherein said torsionally operated resilient spring means is constructed to permit a selected amount of bending deformation in its related longitudinally extending vertical plane and preferably in opposite directions in its two longitudinally extending half sections and wherein said torque control pivot means interconnecting the related axle structure and the spring means of one of its related banking arms is placed a selected vertically extending distance above and a substantially transversely extending distance away from said second ball and socket joint and its related banking arm turn axis.

9. The vehicle of claim 8, wherein the suspension and the resilient support means for the superstructure also comprise at least one transversely extending sway bar carried by the superstructure and operated by a pair of inclined sway bar shackles connecting substantially longitudinally extending sway bar arms to the related rigid axle structure, and wherein the suspension means additionally comprise a tie rod operably extending longitudinally between one roll banking arm in the front of the vehicle and one rear roll banking arm to secure track holding of the pairs of the front wheels relative to the rear wheels.

10. The vehicle of claim 8 wherein each said torque control pivot means comprises a carrier arm extending substantially vertically from the related axle structure, a support arm extending substantially vertically from said second support member, a bolt secured to the upper end of said carrier arm, and cushion means pivotally mounting said support arm upon said bolt for limited universal movement relative thereto.

11. The vehicle of claim 8 wherein said torsionally operated resilient spring means comprises at least one spring leaf of substantially greater width than thickness, placed in a horizontal plane and carrying in its central district a vertically positioned truss column supported by a truss cable means extending from one end of said spring leaf, resting from below against said truss column and extending from there to the other end of the leaf, and wherein said truss column is placed along said spring leaf in a selected position between the downwardly directed force exerted by the respective force component of the pressure active within said superstructure carried multiturn cushion and the axle supported end of the spring leaf so as to cause said force component to create S bending deformation within the spring leaf, whereby said spring center support truss column is activated in response to the changing inclinations of the axle supported end of the spring leaf during varying force application to force the torque control pivot to move longitudinally in a direction opposite to that caused by the movement of the torque control pivot in response to wheel oscillations, maintaining in the process substantially constant axle and steering kingpin caster.

12. The vehicle of claim 1, wherein the suspension and the resilient support means for the superstructure also comprise at least one transversely extending sway bar carried by the superstructure and operated by a pair of inclined sway bar shackles connecting substantially longitudinally extending sway bar arms to the related rigid axle structure, and wherein the suspension means additionally comprise a tie rod operably extending longitudinally between one roll banking arm in the front of the vehicle and one rear roll banking arm to secure track holding of the pairs of the front wheels relative to the rear wheels.

13. The vehicle of claim 1 wherein each said torque control pivot means comprises a carrier arm extending substantially vertically from the related axle structure, a support arm extending substantially vertically from said second support member, a bolt secured to the upper end of said carrier arm, and cushion means pivotally mounting said support arm upon said bolt for limited universal movement relative thereto.

14. The vehicle of claim 13 wherein said bolt is disposed for adjustment of the distance between said carrier arms and said support arm in a direction determining the caster of said axle structure.

* * * * *